June 27, 1961     G. A. HELLAND ET AL     2,989,857
FLEXIBLE POSITIVE DRIVE TORQUE COUPLING
Filed May 2, 1960

*INVENTORS*
OTTO. S NIELSEN
GILMAN A. HELLAND
BY
ATTORNEY

United States Patent Office 2,989,857
Patented June 27, 1961

2,989,857
FLEXIBLE POSITIVE DRIVE TORQUE COUPLING
Gilman A. Helland, Rte. 1, Wayzata, Minn., and Otto S. Nielsen, 4875 Sorrel Ave., Minneapolis, Minn.
Filed May 2, 1960, Ser. No. 26,004
4 Claims. (Cl. 64—11)

This invention relates broadly to machine couplings, more particularly to torque couplings affording a positive driving connection between a machine unit and a power source, and specifically to a positive drive coupling of the class described that is flexible and capable of axial misalignment operation.

The principal object of this invention is to provide a torque coupling affording a positive flexible driving connection between a machine unit and a power source.

A further object of this invention is to provide a flexible positive drive torque coupling of the class described in which no lubrication of the same is necessary.

A further object of this invention is to provide a flexible positive drive torque coupling of the class described that is entirely self-contained and dust free and wherein there are no moving parts.

Still another object of this invention is to provide a flexible positive drive torque coupling of the class described that is capable of operation during axial misalignment of the machine unit and its power source when such units are connected by the subject coupling.

A further object of this invention is to provide a flexible positive drive torque coupling of the class described that is extremely simple and inexpensive to manufacture and assemble and which may be produced in a wide range of sizes.

A further object of this invention is to provide a flexible positive drive coupling of the class described that while relatively small in diameter, the same is capable of fully resisting the tension and compression of torque thrust in an axial direction.

A still further object of this invention is to provide a flexible positive drive coupling of the class described that is capable of axial rotation in either direction without adjustment.

These and other objects of the invention will become apparent from the following specification and claims when taken in conjunction with the accompanying drawings which form a part of this application and in which drawings, like characters indicate like parts throughout the several views.

To the above end, generally stated, the invention consists of the following devices and combinations of devices hereinafter described and defined in the claims.

Referring to the drawings.

Figure 1:
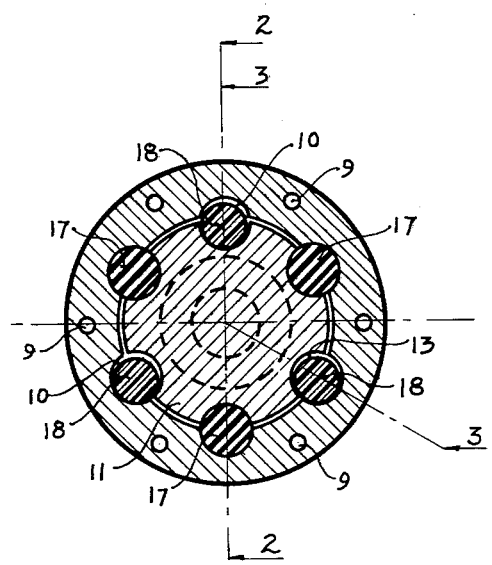
FIG. 1 is an end elevational view of the invention in section taken on the line 1—1 of FIG. 2.
Figure 2:
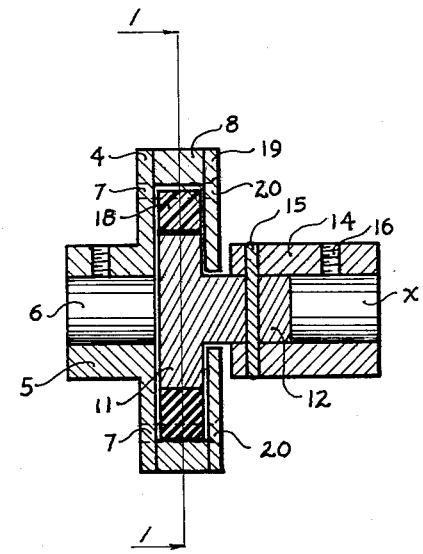
FIG. 2 is a side elevational view of the same also in section, taken on the line 2—2 of FIG. 1.
Figure 3:
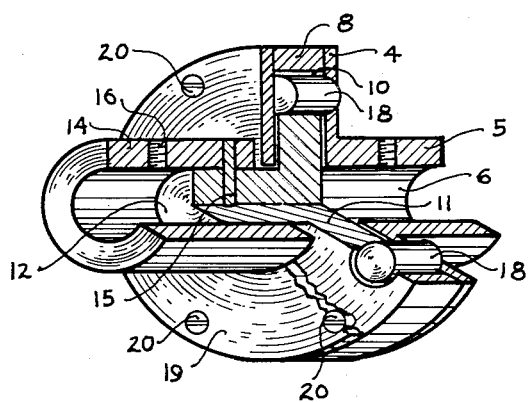
FIG. 3 is an isometric view of the invention partly in section, taken on the lines 3—3 of FIG. 1, some parts being broken away.

It is important to note that in the drawings, the relative position of the coupling unit as shown in FIGS. 2 and 3 has been transposed to better illustrate the assembled elements in FIG. 3. It will be understood, however, that in actual use wherein the subject invention is interposed between a power source, not shown, and a machine unit not shown, that the same may be reversed end for end according to the installation, however, the connection with the power source, as indicated in FIG. 2, is preferable for reasons that will presently appear. Accordingly, for the purpose of this application, it will be assumed that the power source, not shown, will be connected to the coupling unit at the end thereof as indicated by the reference character X, see FIG. 2.

The numeral 4 indicates a flange plate having an integral short shaft 5, an axial bore 6 extending therethrough and a threaded transverse bore extending through the shaft 5 to receive a set screw, not shown, that is turned into driving engagement with the connection to a machine unit, not shown. A plurality of threaded bores 7 are circumferentially spaced about the flange plate 4 for the purpose of assembly as will also presently appear.

An annular spacer member 8 that may be machined from a solid piece of metal or in a punch press operation, may be stamped from a plurality of independent washer-like members to achieve the proper thickness for the said spacer, is also provided with a plurality of bores 9 that are in register with the bores 7 in the flange plate 4 also for assembly purposes.

This annular spacer member 8 is provided at its inside diameter with a plurality of equidistant, circumferentially spaced semi-circular bores 10 and is constructed and arranged to receive a solid flange 11 having an integral solid shaft 12. The said flange 11 is circumferentially dimensioned to a close working fit with the inside diameter of the annular spacer member 8 and is further provided with semi-circular transverse bores 13 that when in register with the semi-circular bores 10 in the spacer ring 8, form a perfect transversely disposed bore 13', the purpose of which will presently appear.

A sleeve 14 has a close working fit with the solid shaft 12 and for the purpose of this application, will be understood to provide the connection to the power source, not shown. A shear pin 15 keys the sleeve 14 against axial rotation on the solid shaft 12 and a threaded transverse bore in the outer end of the sleeve 14 is provided to receive a set-screw which is turned down into engagement with the drive shaft, not shown, of the power source to thus afford a positive driving connection between the coupling unit and the said power source.

The bores 13' formed by the circumferential alignment of the semi-circular bores 10 and 13 respectively are preferably formed in even numbers depending, of course, upon the size of the coupling unit. Alternately inserted in each of the bores 13' are a plurality of resilient pins 17 that are dimensioned to engage said bores with a relatively tight working fit and being of resilient material will absorb the initial torque thrust of the axial rotation of the coupling unit interposed between a power source and a machine unit. In each of the alternate bores 13' are inserted solid nonresilient pins 18 that fit within said bores with a relatively loose working fit and which pins 18 assume the torque thrust of the axial rotation when the peak of the torque thrust is reached. In the drawing it was desired to show the relative looseness of the nonresilient pins 18 relative to the bore 13' and the resilient pins 17 and according in the interest of clarity, the looseness of this pin 18 has been exaggerated. Actually in practice the fit is held to relatively close tolerances.

A relatively heavy washer 19 of the same diameter as the flange plate 4 and the spacer member 8 is centrally bored to fit over the shaft 12 and thus have close fitting engagement with the spacer member 8, see FIGS. 2 and 3. This heavy washer member 19 is similarly provided with a plurality of circumferentially spaced bores 20 that are in register with the threaded bores 7 in the flange plate 4, and the circumferentially spaced bores 9 in the spacer member 8.

To assemble the complete unit it is only necessary to alternately insert the pins 17 and 18 in the respective bores 13', when the semi-circular bores 10 and 13 have been aligned. The transverse bores 7, 9, and 20 are then brought into register and a screw threaded bolt inserted in each thereof extending through the washer 19, the spacer member 8, and into screw threaded engagement with the flange plate 4 to thus provide an extremely simple and rigid assembly of all of the elements of the coupling unit.

While there are herein disclosed a limited number of embodiments of the structure, process and product of the invention herein presented, it is possible to produce still other embodiments without departing from the inventive concept herein disclosed, and it is desired, therefore, that only such limitations be imposed on the appended claims and are stated herein or required by the prior art.

What we claim is:

1. A flexible, positive drive torque coupling for connecting a power source to a machine unit comprising in combination, a circular flange plate having an integral shaft, an axial bore in said shaft to receive a driven or driving connection and means for securing the same on said shaft, a washer-like member and a spacer member interposed between the said flange plate and the washer-like member and means whereby said elements are held in assembled relation, a solid circular flange having a shaft, constructed and dimensioned to close fitting engagement within the annular spacer member for slight axial rotation therein, a plurality of circumferentially disposed transverse bores formed in the periphery of the solid flange and the inner circumference of the annular spacer member, one portion of each of said bores being formed in the said annular spacer member and one portion thereof in the said solid flange whereby when said partial bores are in register a full bore is provided, a resilient pin in each alternate full bore and a solid pin in each full bore lying therebetween to thus hold the flange plate, spacer members and the washer-like member and the solid flange and its shaft against axial rotation when each thereof are connected respectively, to a power source and a machine unit.

2. A flexible, positive drive torque coupling for connecting a power source to a machine unit comprising in combination, a flange plate having a shaft, an axial bore in said shaft and means whereby said shaft may be rigidly secured to a driven or driving connection, a plurality of circumferentially disposed bores in said flange plate, and a disk-like washer member having a plurality of circumferentially disposed bores in register with the bores in the flange plate and a relatively large central bore, an annular spacer member in the form of a ring having a plurality of circumferentially disposed bores in register with the said bores in the flange plate and the disk-like washer member and a plurality of semi-circular transverse bores disposed at equidistant points about the inner circumference of the annular spacer member, a solid flanged member having a solid integral shaft constructed and dimensioned to have close fitting engagement within said annular spacer member and a plurality of semi-circular bores circumferentially disposed about the periphery of the solid flange, said semi-circular bores when aligned with the semi-circular bores in the annular spacer member to thus form a plurality of full transverse bores, a resilient pin in each alternate transverse bore and having close fitting engagement therewith and a solid pin having working clearance with said bore in each alternate bore having the said resilient pins and means on the said solid shaft for connecting the same to a power source or a machine unit, and means extending through the circumferentially disposed bores in the flange plate, the annular spacer member and the dish-like washer member to thus hold all of said elements in assembled relation.

3. The structure defined in claim 2 further including a sleeve fitted to the solid shaft of the solid flange and keyed thereto by a shear pin.

4. The structure defined in claim 2 wherein the solid pins mounted in the said alternate transverse bores in the aligned annular spacer member and the solid flange are of slightly less diameter than the said resilient pins whereby the initial torque thrust is absorbed by the said resilient pins and the peak of the said torque thrust is carried by the said solid pins.

References Cited in the file of this patent

UNITED STATES PATENTS

| | | |
|---|---|---|
| 1,208,252 | Westinghouse | Dec. 12, 1916 |
| 1,467,185 | Meriam | Sept. 4, 1923 |
| 1,915,654 | Edmunds | June 27, 1933 |
| 2,564,826 | Yoder | Aug. 21, 1951 |